US012623333B2

(12) United States Patent
Herman et al.

(10) Patent No.: US 12,623,333 B2
(45) Date of Patent: May 12, 2026

(54) DRILL/DRIVER MULTI-TOOL

(71) Applicant: Robert Bosch GmbH, Stuttgart (DE)

(72) Inventors: Gregory Herman, Elk Grove Village, IL (US); Bradley Padget, Huntley, IL (US); Jeremy Rubens, Palatine, IL (US); Alexander Hills, Belvidere, IL (US); Caitlyn Miklasz, Chicago, IL (US)

(73) Assignees: Robert Bosch Tool Corporation, ML Prospect (IL); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/819,066

(22) Filed: Aug. 29, 2024

(65) Prior Publication Data

US 2026/0061585 A1 Mar. 5, 2026

(51) Int. Cl.
*B25F 5/02* (2006.01)
*B25B 23/18* (2006.01)

(52) U.S. Cl.
CPC ................ *B25F 5/02* (2013.01); *B25B 23/18* (2013.01)

(58) Field of Classification Search
CPC .................................. B25F 5/02; B25B 23/18
USPC ..... 173/1–2, 13, 18–20, 184, 25–31, 38–39, 173/45–53, 162.1, 162.2
See application file for complete search history.

(56) References Cited

U.S. PATENT DOCUMENTS

| | | | | | |
|---|---|---|---|---|---|
| 5,110,027 | A * | 5/1992 | Burlingame | B27F 7/006 | 227/8 |
| 5,148,108 | A * | 9/1992 | Dufour | G01V 3/08 | 324/67 |
| 5,445,479 | A * | 8/1995 | Hillinger | B25F 5/00 | 408/124 |
| 5,484,026 | A * | 1/1996 | Susaki | E04F 15/024 | 173/4 |
| 5,562,240 | A * | 10/1996 | Campbell | B25C 1/04 | 227/5 |
| 6,188,228 | B1 * | 2/2001 | Philipp | B25F 1/00 | 324/67 |
| 6,301,997 | B1 * | 10/2001 | Welte | B25H 1/0092 | 33/286 |
| 6,851,487 | B1 * | 2/2005 | Shotey | B25F 5/00 | 173/171 |
| 6,858,286 | B1 * | 2/2005 | Simm | B25F 5/006 | 81/492 |
| 7,018,142 | B2 * | 3/2006 | Cooper | B25F 5/02 | 408/124 |
| 7,150,587 | B2 * | 12/2006 | Dils | G01V 3/15 | 324/67 |

(Continued)

FOREIGN PATENT DOCUMENTS

| | | | |
|---|---|---|---|
| DE | 202012011368 U | 3/2014 | |
| EP | 0142650 A2 * | 5/1985 | B25F 5/02 |

*Primary Examiner* — Robert F Long
(74) *Attorney, Agent, or Firm* — Kelly McGlashen

(57) ABSTRACT

A hand-held powered multi-tool integrates a rotary driver, a capacitive stud finder and a level detection device into a single tool housing. The tool housing includes a head portion that houses a motor, a hand grip portion that protrudes from a rear end of the head portion, and a guard portion. The guard portion is generally U-shaped and joined to a forward-facing edge of the hand grip portion. The stud finder is integrated into a base of the guide portion, while the level detection device is integrated into a leg of the guard portion.

16 Claims, 3 Drawing Sheets

(56) References Cited

U.S. PATENT DOCUMENTS 7,217,069 B2 * 5/2007 Dils ........................ G01V 3/15
324/67
7,331,113 B1 * 2/2008 Patrick ................ B25H 1/0092
33/286
7,346,847 B2 * 3/2008 Etter ....................... B27B 27/06
715/740
7,359,762 B2 * 4/2008 Etter .................... G05B 19/409
83/76.9
8,004,664 B2 * 8/2011 Etter ......................... B25F 5/00
356/139.1
8,272,813 B1 * 9/2012 Wise .................... B23D 59/001
408/16
8,517,642 B2 * 8/2013 Borunda ................. B25B 23/00
324/67
9,415,488 B2 * 8/2016 Puzio ........................ B25F 5/02
9,595,701 B2 * 3/2017 Matthias ................. G01S 17/06
9,899,899 B2 * 2/2018 Sergyeyenko .......... H02P 25/24
9,908,234 B2 3/2018 Fuchs et al.
9,937,565 B2 4/2018 Hu et al.
10,105,140 B2 * 10/2018 Malinouskas .......... A61B 90/98
10,442,065 B2 * 10/2019 Schieler .................... B25C 1/04
10,807,219 B2 * 10/2020 Mueckl .................. G01B 11/14
2002/0125857 A1 * 9/2002 Mastaler ............... H02J 7/0045
320/112
2005/0111214 A1 * 5/2005 Zeiler ..................... B25B 23/18
362/119
2005/0251921 A1 * 11/2005 Del Cogliano .......... G01V 3/15
7/143
2006/0104735 A1 * 5/2006 Zeiler ..................... B25F 5/021
173/217
2011/0114345 A1 * 5/2011 Schlesak ................ B25D 17/00
173/1
2011/0148437 A1 * 6/2011 Lawrence ............... B25C 1/047
340/686.1
2013/0192860 A1 * 8/2013 Puzio ...................... B25F 5/001
335/219
2013/0243538 A1 * 9/2013 Hu .......................... B23B 45/02
408/16
2014/0184397 A1 * 7/2014 Volpert ..................... B25F 5/00
340/12.51
2014/0360746 A1 12/2014 Hiller
2015/0309640 A1 * 10/2015 Vuckovic ............ G06F 3/04883
173/1
2018/0143615 A1 * 5/2018 Aizawa ................ G05B 19/409
2018/0345432 A1 * 12/2018 Hill ........................ B23Q 5/045
2019/0111551 A1 * 4/2019 Kato ....................... B25B 21/02
2019/0321960 A1 * 10/2019 Czirjak .................. H02K 7/145
2021/0205976 A1 * 7/2021 Matei ........................ G08B 7/06
2021/0237253 A1 * 8/2021 Moss ...................... B25B 21/00
2022/0111500 A1 * 4/2022 Hale ..................... B25B 23/045
2022/0193883 A1 * 6/2022 Öberg ........................ B25F 5/02
2022/0314411 A1 * 10/2022 Kamiya ............... B25D 16/006
2024/0220848 A1 * 7/2024 Mahmud ................ G06N 20/00
2024/0308034 A1 * 9/2024 Kamiya ................ B25B 21/026

* cited by examiner

DRILL/DRIVER MULTI-TOOL

BACKGROUND

When doing a repair or improvement project around the home or in the workplace, multiple tools may be needed in order to complete the project. For example, in order to perform a wall-mounting project, the person performing the project would need to own and/or gather together several individual tools, including a rotary driver, a stud detector and a level detector. A rotary driver is a hand-held rotary tool having an adjustable chuck that can accommodate drill cutting and driving bits of various sizes. A stud finder is another handheld device and may be used within wood or "stick built" buildings to locate framing studs located behind wall surfaces, usually drywall wall surfaces. A level detector is a device used to establish a horizontal or vertical plane.

When using a conventional stud detector, a user will press the detector against the wall and move it back and forth to try to locate each side of a stud behind the wall. Following finding the stud, the user will need to change tools. Following use of the stud detector, the user may use the rotary driver to drive fasteners through the object being mounted and into the wall. Following use of the rotary driver, a user may use the level device to check the final orientation of the mounted object or device relative to a horizontal. Some users may not have all needed tools or may find it cumbersome to keep switching between several different tools while working on a project.

It is desirable to provide a single tool that combines the functionality of multiple tools in order to simplify performance of frequently performed projects and reduce tool storage needs.

SUMMARY

In some aspects, a hand-held power multi-tool may integrate several tools often used to complete a common project into a single device. For example, in the illustrated embodiment, the multi-tool is a hand-held powered rotary driver that also incorporates a capacitive stud finder and a level detection device. Such a multi-tool would be useful in hanging pictures or shelving on the walls of a room. In use, a user would need a single multi-tool, to identify a location on a wall corresponding to a stud, drill a hole in the wall and stud for receipt of a fastener, and to level the object mounted via the fastener.

In addition to the convenience of having multiple tool functions in a single power tool, the multi-tool described herein combines the stud finder and drill/driver in a unique way. In one example, the stud finder is permanently integrated into the tool housing by means of a U-shaped "knuckle guard" referred to herein as a "guard" located in front of the user's hand. The guard is a portion of the tool housing that provides a natural extension of a typical pistol-type tool grip and is ideally suited for receiving the stud finder while providing ease of handling and positioning the stud finder in use. Moreover, by placement of the stud finder in the guard portion of the tool housing, the capacitive stud finder is physically separated from other electrical components of the multi-tool. This physical separation isolates the electrical components of the stud finder from other electronics or dense objects that may interfere with the stud finder detection sensitivity.

In another example, a large area of the guard is available for indicators and/or other human interface devices such as displays, interfaces or other indicator schemes. For example, in some embodiments, a series of LED indicators may be provided on both lateral sides of the guard. By providing interface devices on each of opposed sides of the tool housing, the indicators can be seen by both right and left-handed users and/or in situations in which the tool is used in unusual orientations.

In another example, the multi-tool includes a protruding proximity switch on the front face of a detector surface of the stud detector. The proximity switch detects when the detector surface is pressed against the wall. Upon detection that the detector surface of the detector is pressed against the wall, a controller within the multi-tool automatically activates the stud detection device.

In another example, the stud finder is powered using the main battery of the multi-tool.

In yet another example, other tools may be stored in the tool housing for easy access. For example, the outer surface of the housing may include recesses that receive and detachably retain drill bits, driver bits, level detectors, wrenches or other frequently used ancillary devices.

In some aspects, a hand-held power tool includes a tool housing. The tool housing includes a head portion that is elongated in a front-to-rear direction of the tool and a hand grip portion that protrudes from a rear end of the head portion. The hand grip portion has a proximal end that adjoins the head portion and a distal end that is spaced apart the proximal end. The tool housing also includes a U-shaped guard portion that protrudes from the head portion. The guard portion has a first leg that extends from the proximal end of the hand grip portion toward a front of the tool, a second leg that extends from the distal end of the hand grip portion toward the front of the tool, and a base that is spaced apart from the hand grip portion and extends from the first leg to the second leg. The hand-held power tool includes a motor that is disposed in the head portion and a chuck that disposed on a front of the head portion. The chuck is mechanically connected to an output shaft of the motor. The hand-held power tool includes an actuator that protrudes from the tool housing into a space between the hand grip portion and the guard portion and is configured to actuate a switch when the actuator is depressed by the user. In addition, the hand-held power tool includes a stud finder that is integrated into the guard portion.

In some embodiments, the base has a planar detection surface that faces away from the hand grip portion, and a sensor of the stud finder faces the detection surface and is configured to detect capacitance in a direction perpendicular to the detection surface.

In some embodiments, the base includes a first lateral side surface that extends along one side edge of the planar detection surface and a second lateral side surface that extends along another side edge of the planar detection surface. The first lateral side surface and the second lateral side surface are on opposed sides of the planar detection surface. In addition, at least one of the first lateral side surface and the second lateral side surface includes an indicator that provides an indication of whether a change in capacitance is detected by the sensor. In other embodiments, each of the first lateral side surface and the second lateral side surface includes an indicator that provides an indication of whether a change in capacitance is detected by the sensor.

In some embodiments, the base includes a proximity switch that is disposed on the detection surface and is configured to move between a first switch configuration in which the stud finder is not activated and a second switch configuration in which the stud finder is activated. When the detection surface is spaced apart from a surface to be detected, the proximity switch is in the first switch configuration and when the detection surface abuts a surface to be detected, the proximity switch is in the second switch configuration.

In some embodiments, the stud finder is activated by a proximity switch.

In some embodiments, the stud finder is an electronic stud finder and includes a capacitance detector, a stud finder printed circuit board assembly, and logic electronics that are supported on the stud finder printed circuit board assembly and electrically connected to the capacitance detector.

In some embodiments, the hand-held power tool includes a power supply that is detachably mounted to the tool housing and electrically connected to the motor via the switch.

In some embodiments, the stud finder is powered using the power supply.

In some embodiments, the second leg includes an interior cavity that intersects an outer surface of the second leg, and the power tool includes a level detection device that is configured to be removably stowed in the cavity and retained in the cavity by a retainer.

In some embodiments, the level detection device includes a level detector housing and a level detector disposed in the level detector housing. The level detector is configured to detect a level of a reference surface of the level detector housing. In addition, the level detection device includes a laser that is disposed in the level detector housing. The laser is configured to emit a beam of visible light in a predetermined direction relative to the reference surface.

In some embodiments, the level detection device is powered by a level detection device battery.

In some embodiments, the first leg includes a work light that is configured to project visible light toward an area forward of the chuck.

In some embodiments, an outer surface of the guard portion includes a recess that is configured to receive and retain therein an accessory of the power tool.

In some embodiments, the accessory is one of a drill bit and a rotary driver.

By utilizing the unused area in front of the tool's grip, a stud finder can be placed in a location where its use is in a natural position relative to the pistol grip of the drill/driver. This location also isolates the sensitive detector from the tool and offers the best visibility to indicators.

DETAILED DESCRIPTION

Figure 1:
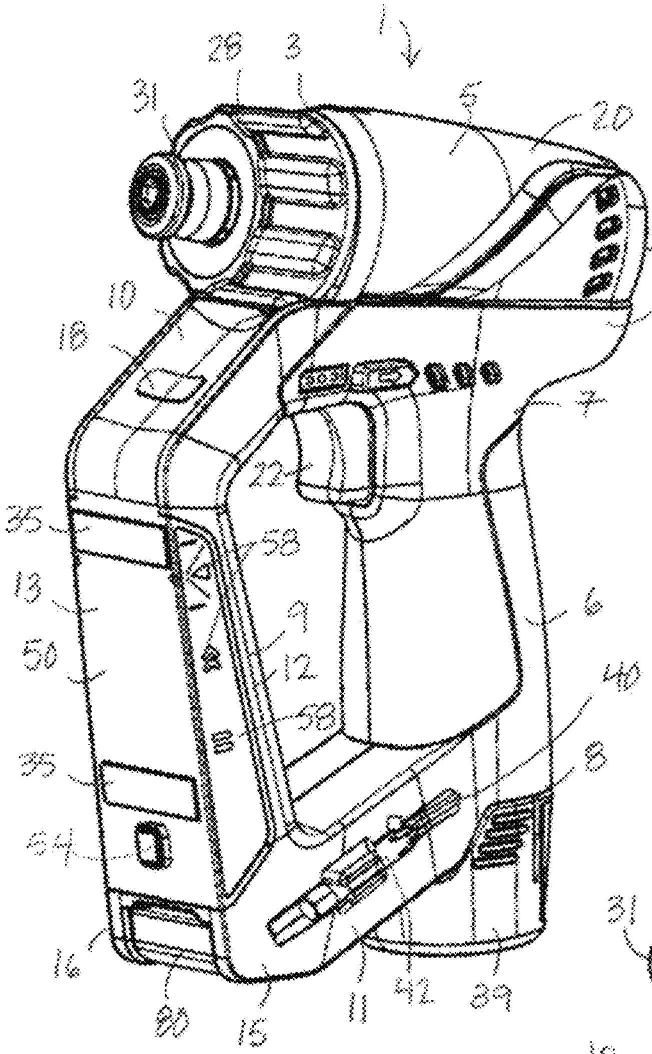
FIG. 1 is a front perspective view of the hand-held power multi-tool.
Figure 2:
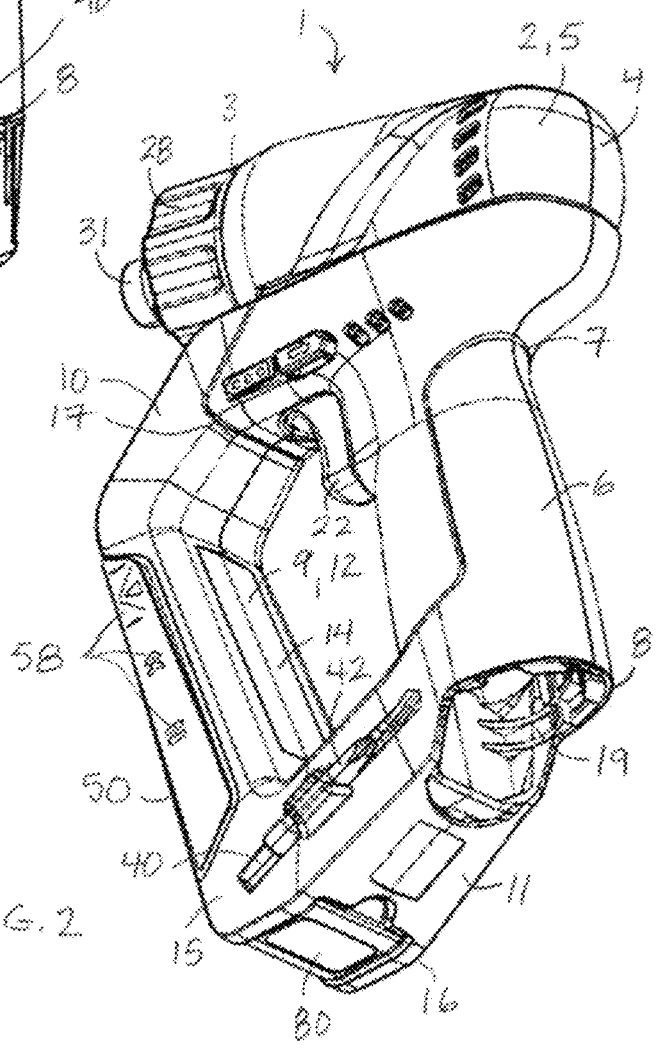
FIG. 2 is a rear perspective view of the hand-held power multi-tool of FIG. 1, shown with the battery pack detached.
Figure 3:
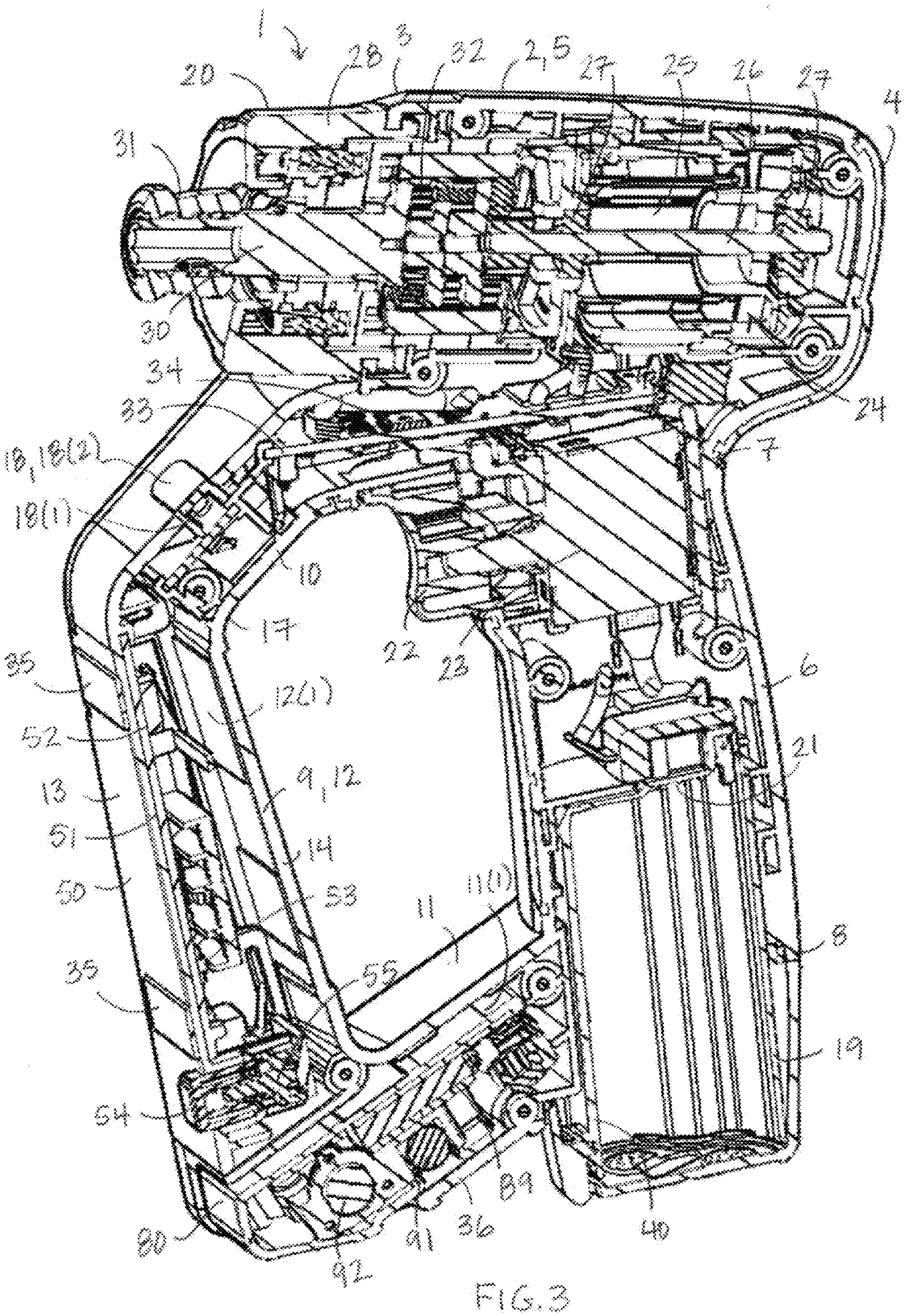
FIG. 3 is a cross-sectional view of the hand-held power multi-tool of FIG. 1.

Referring to FIGS. 1-3, a hand-held power multi-tool 1 includes a hand-held rotary power tool such as a rotary driver 20 that incorporates a stud finder 50 and a level detection device 80 within a tool housing 2 of the rotary driver 20. In the illustrated embodiment, the stud finder 50 and level detection device 80 are disposed in a previously unused area of the tool 1 in front of the power tool's grip, which is a natural location for use of the stud finder 50. This location also isolates the stud finder electronics 52, 53 from those of the rotary driver 20 and provides a location for placement of tool status indicators 58 that are easily seen by the user. The hand-held power multi-tool 1 is described in detail below.

The rotary driver 20 may be a drill/driver that includes a drivetrain 24 disposed in the tool housing 2. The tool housing 2 includes front end 3 corresponding to the end of the rotary driver furthest from the user when the rotary driver 20 is in use, and a rear end 4 opposite the front end 3. The tool housing 2 includes a head portion 5, a hand grip portion 6 and a guard portion 9. In some embodiments, the tool housing 2 is an assembly of two clam shell housing portions that, when assembled provide interior spaces within each of the head portion 5, the hand grip portion 6 and the guard portion 9.

The head portion 5 of the tool housing 2, which houses the drivetrain, is generally cylindrical and elongated in the front-to-rear direction of the rotary driver 20. References to direction such as, but not limited to, top, bottom, upper, lower, above, below, overlie, underlie, underside, etc., are made herein with respect to the orientation of the tool 1 as illustrated in FIG. 1. It is understood that these terms are relative terms and that the tool 1 may be used and stored in any orientation. However, the terms "front" and "rear" are made explicit with respect to their corresponding reference numbers 3, 4 and terms such as forward and rearward are used with reference to the front and rear directions.

The hand grip portion 6 protrudes from the head portion 5 at the tool housing rear end 4. In the illustrated embodiment the head portion 5 and the hand grip portion 6 are arranged in a "pistol grip" configuration. The hand grip portion 6 is generally cylindrical, has a proximal end 7 that adjoins the head portion 5 and a distal end 8 that is opposite and spaced apart from the proximal end 7.

The guard portion 9 is a generally U-shaped structure that protrudes from the head and hand grip portions 5, 6. The guard portion includes a first leg 10, a second leg 11 and a base 12 that joins and end of the first leg 10 to an end of the second leg 11 to form the U configuration. In particular, the first leg 10 extends from the proximal end 7 of the hand grip portion 6 toward a front end 3 of the rotary driver 20. The first leg 10 includes a bend 17, and a portion of the first leg 10 adjoins the underside of the head portion 5. The second leg 11 extends from the distal end 8 of the hand grip portion 6 toward the front end 3 of the rotary driver 20. The base 12 extends from the first leg 10 to the second leg 11 so as to be spaced apart from the hand grip portion 6. By this configuration, both the hand grip portion 6 and the guard portion 9 depend from the underside of the head portion 5, and the guard portion 9 is positioned forward of the hand grip portion 6. In this location, the guard portion 9 may sometimes be referred to as a "knuckle guard" since the guard portion 9 overlies the user's knuckles while the user grips the hand grip portion 6.

Unlike the cylindrically shaped hand grip portion 6, the first and second legs 10, 11 and base 12 of the guard portion 9 each have a rectangular cross sectional shape. The base 12 has a rear surface 14 faces the hand grip portion 6 and a detection surface 13 that faces away from the hand grip portion 6 and is planar. The base 12 also includes first and second lateral side surfaces 15, 16 that extend between the detection surface 13 and the rear surface 14. An interior space 12(1) of the base is defined between the detection surface 13, the rear surface 14 and the first and second lateral side surfaces 15, 16.

The drivetrain 24 is disposed within the interior space of the head portion 5. The drivetrain 24 includes an electric motor 25, a gearset 32, a clutch 28, a spindle 30 and a quick-release chuck 31. The motor 25 has an output shaft 26 that drives the gearset 32. The output shaft 26 is supported within the head portion 5 by bearings 27. The gearset 32 transmits the rotary output of the motor 25 to the clutch 28 and allows for variable speed and torque control. The clutch 28 mechanically connects the spindle 30 to the chuck 31 and permits the user to adjust the output torque. The spindle 30 is driven by the clutch 28 and drives the chuck 31. The chuck 31 may include jaws that grip an accessory (e.g., the drill bit or driver bit, not shown) and transfers the output of the spindle 30 to the accessory.

The motor 25 is powered by a power supply. In the illustrated embodiment, the power supply is a detachable and rechargeable battery pack 39 but is not limited to this type of power source. The battery pack 39 is received in a vacancy 19 that opens through the hand grip portion distal end 8 and includes electrical connectors (not shown) that permit electrical connection of the battery pack 29 to a printed circuit board assembly (PCBA) 33 that includes a controller 34 and ancillary electronic devices used to control the rotary driver 20 during operation. When disposed in the vacancy 19, the battery pack 39 is electrically connected to the motor via a driver switch 23.

The rotary driver 20 includes an actuator such as trigger 22 that protrudes from the tool housing 2 into a space between the hand grip portion 6 and the guard portion 9. In particular, the trigger 22 protrudes from proximal end 7 of the hand grip portion 6 and is configured to actuate the driver switch 23 when the trigger 22 is depressed by the user. The driver switch 23 is disposed in the hand grip portion 6 and is permits the user to selectively electrically connect the motor 25 and the battery pack 39.

The rotary driver 20 includes a work light 18 that is configured to direct visible light toward the front of the tool 1 for the purpose of illuminating a work piece or a project work area. The work light 18 may be an LED 18(1) or other known light source that is mounted in the guard portion 9. For example, in the illustrated embodiment, the work light 18 is disposed adjacent to a transparent window 18(2) provided in a forward-facing surface of the guard portion first leg 10. The work light 18 is powered by the battery pack 39 via the PCBA 33 and may automatically turn on upon activation of the trigger 22.

The multi-tool 1 includes a stud finder 50 that is integrated into the rotary driver 20. In the illustrated embodiment, the stud finder 50 is a capacitive stud finder, but is not limited to this type of stud finder. A capacitive stud finder uses changes in capacitance generated by material density differences to determine the location of a stud in a wall structure. The stud finder 50 relies on one or more sensors 51 that detect changes in the dielectric constant of the wall structure. The dielectric constant changes when the sensor 51 overlies a stud. For example, when the sensor 51 inside the stud finder 50 overlies the wall structure at a location without a stud, it detects one dielectric constant, but when the stud finder 50 overlies the wall structure at a location with a stud, the sensor 51 detects a different dielectric constant. For example, a lower dielectric constant may indicate the presence of a stud in the wall structure.

In the illustrated embodiment, the stud finder 50 is disposed in the interior space 12(1) of the guard portion base 12. In particular, a capacitance-detecting sensor 51 of the stud finder underlies and faces the detection surface 13 with no intervening structures. The sensor is configured to detect capacitance in a direction in front of and perpendicular to the detection surface 13. The sensor 51 may be supported on a stud finder PCBA 52. The stud finder PCBA 52 is powered using the power supply 39 and also supports logic electronics that processes and communicates the output of the capacitance detector to a human-machine interface (HMI) provided on one or both lateral sides of the guide portion 9. In the illustrated embodiment, both the left and right lateral side surfaces 15, 16 of the guide portion 9 includes an HMI.

In the illustrated embodiment, the HMI on a given side of the guide portion 9 includes a grouping of several LED-lit indicators 58 that provide an indication of whether a stud is detected by the stud detector. For example, the grouping may include three separate indicators 58 which respectively indicate the presence of a stud, an indication that the stud finder 50 is ready to be moved relative to the wall structure, and a paused state of the device. Although the HMI is described herein as being a grouping of LED-lit indicators, the HMI is not limited to this type of user interface or the illustrated indicators.

The stud finder 50 is actuated by a proximity switch actuator 54 that is disposed on the detection surface 13. The proximity switch actuator 54 controls the operation of a proximity switch 55 and is movable between an advanced configuration in which the proximity switch actuator 54 protrudes outward from the detection surface and the proximity switch 55 is off, and a retracted configuration in which the proximity switch actuator 54 is flush with or recessed relative to the detection surface 13 and the proximity switch 55 is on. The proximity switch actuator 54 is biased to the advanced configuration by an elastic member (not shown).

The proximity switch 55 is disposed in the interior space 12(1) of the guard portion base 12 adjacent to the stud finder PCBA 52. The proximity switch 55 is configured to switch between a first switch configuration in which the stud finder is not activated and a second switch configuration in which the stud finder is activated. When the detection surface 13 is spaced apart from a wall surface to be detected, the proximity switch actuator 54 is in the advanced configuration relative to the detection surface 13 and the proximity switch 55 is in the first switch configuration whereby the stud finder is inactive. When the detection surface 13 abuts a wall surface, the proximity switch actuator 54 is depressed by the wall structure to the retracted configuration and the proximity switch is in the second switch configuration whereby the stud finder 50 is activated.

Thin felt pads 35 may be provided on an outer side of the detection surface 13. The felt pads 35 facilitate smooth movement of the stud finder 50 across a wall surface and protect wall surface finishes during use of the stud finder 50.

Figure 4:
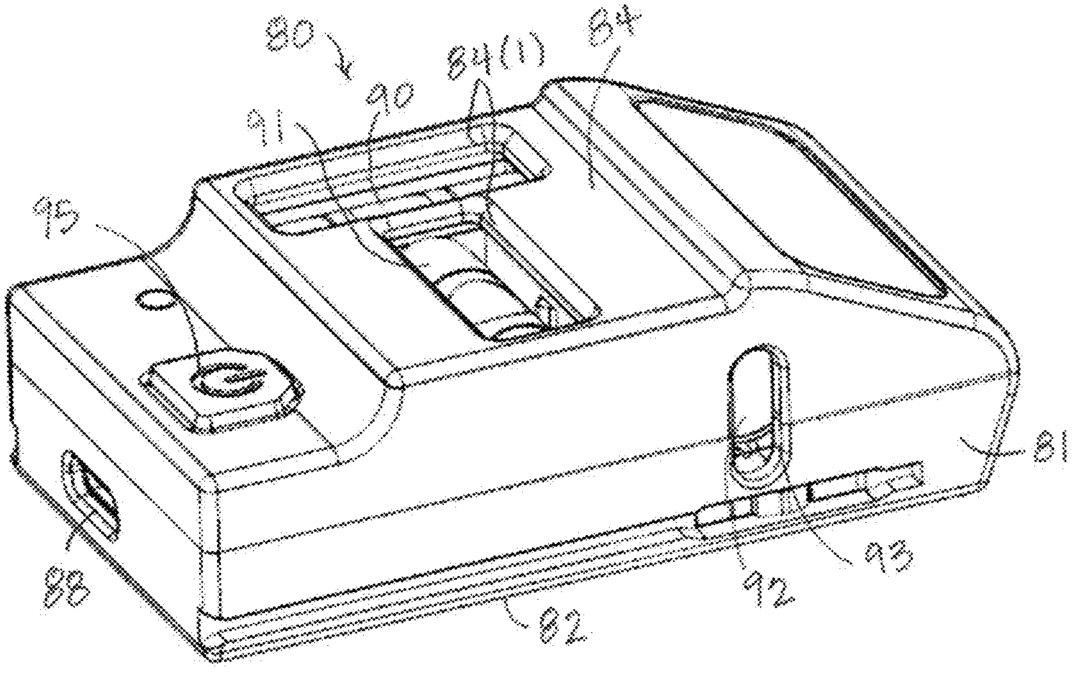
FIG. 4 is a perspective view of the level detection device.
Figure 5:
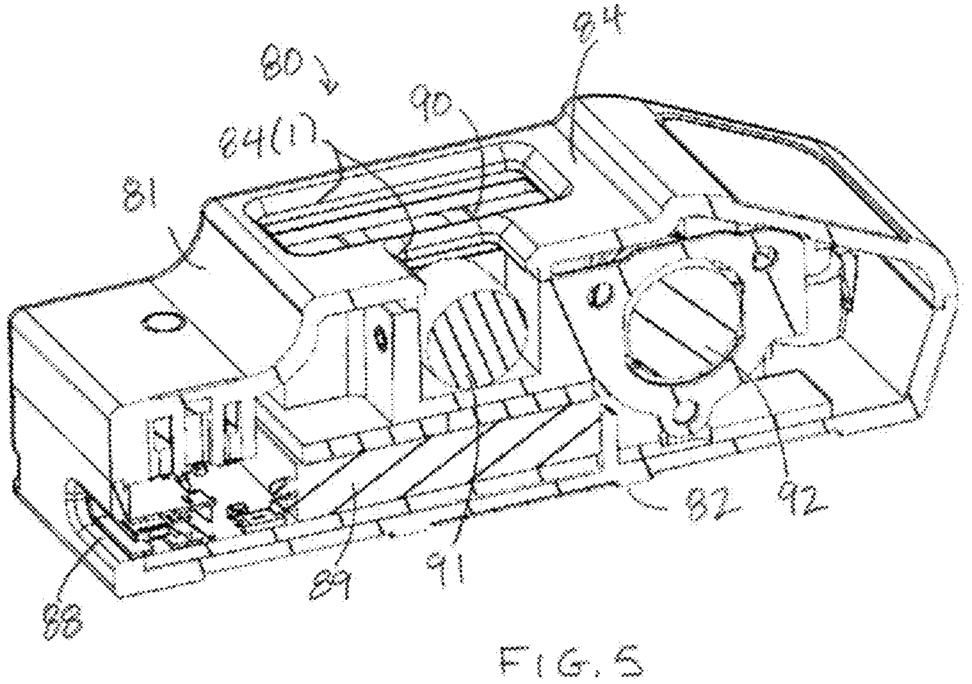
FIG. 5 is a cross-sectional view of the level detection device.

Referring to FIGS. 4 and 5, the power tool 1 includes the level detection device 80 that is configured to be removably stowed in the guide portion 9 of the tool housing 2. In particular, the level detection device 80 is received within a cavity 11(1) provided in the interior space of the second leg 11. In the illustrated embodiment, the level detection device 80 is retained in the cavity 11(1) by a spring-loaded retainer 36. The cavity 11(1) intersects an outer surface of the second leg 11 adjacent to the base 12 whereby the cavity 11(1) opens facing in the forward direction of the tool 1.

In the illustrated embodiment, the level detection device 80 includes two small cylindrical glass tubes 90, 91 that are supported in a detector housing 81 so as to be visible via a first surface 84 of the detector housing 81. For example, the first surface 84 may include openings 84(1) through which the tubes 90, 91 may be viewed. Each glass tube is slightly curved and contains alcohol or a similar liquid and an air bubble. The tubes 90, 91 are sealed and include markings that indicate when the bubble is centered therein. The first surface 84 is on an opposed side of the detector housing with respect to a planar surface that is a reference surface 82. In particular, both tubes 90, 91 are fixed to be parallel to the reference surface 82. A centerline of the first tube 90 is arranged to be perpendicular to a centerline of the second tube 91. Adjustment of the reference surface 82 to the horizontal (or vertical) is indicated by movement of the bubble relative to reference markings provided on the corresponding first or second tube 90, 91.

In addition to the tubes 90, 91, the level detection device 80 also includes a laser 92 that emits visible light. The laser 92 is disposed in the detector housing 81 and is arranged in parallel to the second tube 91. When powered, the laser 92 emits a beam of visible light through an opening 93 in a lateral side 83 of the detector housing 81. The laser 92 is arranged to emit the beam of visible light in a direction that is parallel to the reference surface 82, whereby the beam can be used as a visible reference during operation.

In the illustrated embodiment, an internal battery 89 supplies power to the laser 92 upon actuation of a power switch 95. The internal battery 89 may be rechargeable and can be recharged via a battery charging port 88 provided in the detector housing 81.

Referring again to FIGS. 1 and 2, the tool housing 2 may include structures configured to receive and retain therein an accessory 42 of the power tool 1. For example, the accessory 42 may be a drill bit or a rotary driver. The retaining structures may include an elongate, shallow recess 40 that is shaped and dimensioned to receive the accessory 42 in a press-fit or snap fit configuration. In the illustrated embodiment, the recess 40 is provided in an outer surface of the guard portion 9. More specifically, the recess 40 is formed in an outer surface of a lateral side of the guard second leg 11. In some embodiments, more than one recess 40 may be provided. For example, multiple recesses 40 may be arranged side-by-side. In another example, one or more recesses 40 may be provided on each of opposed lateral sides of the guard 9.

Although the stud finder described herein is an electronic stud finder, the stud finder is not limited to this type. For example, in some embodiments, the stud finder may alternatively be magnetic, radar-based device or other known detector.

Although a bubble detector is described herein, the level detector is not limited to being a bubble detector and other types of level detectors may be substituted for the bubble detector. For example, a variety of sensors may be used for point detection of solids, including vibrating, diaphragm, radar, capacitance, optical and ultrasonic sensors.

An exemplary embodiment of the tool is described above in some detail. It should be understood that only structures considered necessary for clarifying the tool have been described herein. Other conventional structures, and those of ancillary and auxiliary components of the tool are assumed to be known and understood by those skilled in the art. Moreover, while a working example of the tool has been described above, the tool is not limited to the working example described above, but various design alterations may be carried out without departing from the device as set forth in the claims.

What is claimed is:

1. A hand-held power tool, comprising:

a tool housing, the tool housing including a head portion that is elongated in a front-to-rear direction of the tool, a hand grip portion that protrudes from a rear end of the head portion, the hand grip:

portion having a proximal end that adjoins the head portion and a distal end that is spaced apart the proximal end, and a U-shaped guard portion that adjoins the head portion, the guard portion having a first leg that extends from the proximal end of the hand grip portion toward a front of the tool, a second leg that extends from the distal end of the hand grip portion toward the front of the tool, and a base that is spaced apart from the hand grip portion and extends from the first leg to the second leg;

a motor that is disposed in the head portion;

a chuck that disposed on a front of the head portion and is mechanically connected to an output shaft of the motor;

an actuator that protrudes from the tool housing into a space between the hand grip portion and the guard portion, and is configured to actuate a switch when the actuator is depressed by the user; and a stud finder that is integrated into the guard portion, wherein the base has a planar detection surface that faces away from the hand grip portion, and a sensor of the stud finder faces the detection surface and is configured to detect capacitance in a direction perpendicular to the detection surface.

2. The hand held power tool of claim 1, wherein the base includes a first lateral side surface that extends along one side edge of the planar detection surface and a second lateral side surface that extends along another side edge of the planar detection surface, the first lateral side surface and the second lateral side surface are on opposed sides of the planar detection surface, at least one of the first lateral side surface and the second lateral side surface includes an indicator that provides an indication of whether a change in capacitance is detected by the sensor.

3. The hand held power tool of claim 1, wherein the base includes a first lateral side surface that extends along one side edge of the planar detection surface and a second lateral side surface that extends along another side edge of the planar detection surface, the first lateral side surface and the second lateral side surface are on opposed sides of the planar detection surface, each of the first lateral side surface and the second lateral side surface includes an indicator that provides an indication of whether a change in capacitance is detected by the sensor.

4. The hand held power tool of claim 1, wherein the base includes a proximity switch that is disposed on the detection surface and is configured to move between a first switch configuration in which the stud finder is not activated and a second switch configuration in which the stud finder is activated, and wherein when the detection surface is spaced apart from a surface to be detected, the proximity switch is in the first switch configuration and when the detection surface abuts a surface to be detected, the proximity switch is in the second switch configuration.

5. The hand-held power tool of claim 1, wherein the stud finder is activated by a proximity switch.

6. The hand-held power tool of claim 1, wherein the stud finder is an electronic stud finder and includes a capacitance detector, a stud finder printed circuit board assembly, and logic electronics that are supported on the stud finder printed circuit board assembly and electrically connected to the capacitance detector.

7. The hand-held power tool of claim 1, comprising a power supply that is detachably mounted to the tool housing and electrically connected to the motor via the switch.

8. The hand-held power tool of claim 7, wherein the stud finder is powered using the power supply.

9. The hand-held power tool of claim 1, wherein the second leg includes an interior cavity that intersects an outer surface of the second leg, and the power tool includes a level detection device that is configured to be removably stowed in the cavity and retained in the cavity by a retainer.

10. The hand-held power tool of claim 9, wherein the level detection device comprises:

a level detector housing, a level detector disposed in the level detector housing, the level detector configured to detect a level of a reference surface of the level detector housing, and a laser disposed in the level detector housing, the laser configured to emit a beam of visible light in a predetermined direction relative to the reference surface.

11. The hand-held power tool of claim 9, wherein the level detection device is powered by a level detection device battery.

12. The hand-held power tool of claim 1, wherein the first leg includes a work light that is configured to project visible light toward an area forward of the chuck.

13. The hand-held power tool of claim 1, wherein an outer surface of the guard portion includes a recess that is configured to receive and retain therein an accessory of the power tool.

14. The hand-held power tool of claim 13, wherein the accessory is one of a drill bit and a rotary driver.

15. A hand-held power tool, comprising:

a tool housing, the tool housing including a head portion that is elongated in a front-to-rear direction of the tool, a hand grip portion that protrudes from a rear end of the head portion, the hand grip portion having a proximal end that adjoins the head portion and a distal end that is spaced apart the proximal end, and a U-shaped guard portion, the guard portion having a first leg that extends from the proximal end of the hand grip portion toward a front of the tool, a second leg that extends from the distal end of the hand grip portion toward the front of the tool, and a base that is spaced apart from the hand grip portion and extends from the first leg to the second leg;

a motor that is disposed in the head portion;

a chuck that disposed on a front of the head portion and is mechanically connected to an output shaft of the motor;

an actuator that protrudes from the tool housing into a space between the hand grip portion and the guard portion, and is configured to actuate a switch when the actuator is depressed by the user; and a stud finder that is integrated into the guard portion, wherein the base includes a proximity switch that is configured to move between a first switch configuration in which the stud finder is not activated and a second switch configuration in which the stud finder is activated, and wherein when a surface of the base is spaced apart from a surface to be detected, the proximity switch is in the first switch configuration and when the surface of the base abuts a surface to be detected, the proximity switch is in the second switch configuration.

16. A hand-held power tool, comprising:

a tool housing, the tool housing including a head portion that is elongated in a front-to-rear direction of the tool, a hand grip portion that protrudes from a rear end of the head portion, the hand grip portion having a proximal end that adjoins the head portion and a distal end that is spaced apart the proximal end, and a U-shaped guard portion that adjoins the head portion, the guard portion having a first leg that extends from the proximal end of the hand grip portion toward a front of the tool, a second leg that extends from the distal end of the hand grip portion toward the front of the tool, and a base that is spaced apart from the hand grip portion and extends from the first leg to the second leg;

a motor that is disposed in the head portion;

a chuck that disposed on a front of the head portion and is mechanically connected to an output shaft of the motor;

an actuator that protrudes from the tool housing into a space between the hand grip portion and the guard portion, and is configured to actuate a switch when the actuator is depressed by the user; and a stud finder that is integrated into the guard portion, wherein the second leg includes an interior cavity that intersects an outer surface of the second leg, and the power tool includes a level detection device that is configured to be removably stowed in the cavity and retained in the cavity by a retainer.

* * * * *